United States Patent [19]

May et al.

[11] Patent Number: 4,901,083
[45] Date of Patent: Feb. 13, 1990

[54] NEAR OBSTACLE DETECTION SYSTEM

[75] Inventors: Phillip A. May, Goleta; Cheng P. Wen, Mission Viejo; Douglas L. Dunn, Bellflower; Stephen J. Ferry, Santa Barbara, all of Calif.

[73] Assignees: Delco Electronics Corporation; Santa Barbara Research Center, both of Goleta; Hughes Aircraft Company, Los Angeles, all of Calif.

[21] Appl. No.: 209,111

[22] Filed: Jun. 20, 1988

[51] Int. Cl.⁴ .................. G01S 13/34; G01S 13/93
[52] U.S. Cl. ................................ 342/128; 342/70
[58] Field of Search ............... 342/128, 122, 196, 70, 342/71, 72, 192, 109, 91, 124, 194

[56] References Cited
U.S. PATENT DOCUMENTS

| | | | |
|---|---|---|---|
| 2,907,023 | 9/1959 | Skinner | 342/128 |
| 3,108,273 | 10/1963 | Erst | 342/128 |
| 3,182,323 | 5/1965 | Nilssen | 342/109 |
| 3,893,114 | 7/1975 | Yamanaka et al. | 342/72 |
| 4,079,377 | 3/1978 | Zur Heiden et al. | 342/109 |
| 4,620,192 | 10/1986 | Collins | 342/128 |
| 4,737,791 | 4/1988 | Jean et al. | 342/124 |

Primary Examiner—Thomas H. Tarcza
Assistant Examiner—Gilberto Barrón, Jr.
Attorney, Agent, or Firm—Howard N. Conkey

[57] ABSTRACT

In a radar system, an RF signal is transmitted at a frequency modulated by a sawtooth signal. The transmitted RF signal is mixed with the transmitted signal reflected from an object. The resulting IF signal is analyzed into a Fourier series having a DC coefficient and harmonic frequency coefficients. The range to the object is determined from the harmonic frequency coefficients in multiples of the range resolution determined by the RF bandwidth of the system when the DC coefficient is less than each of the harmonic frequency coefficients. The range to the object is determined to be within ½ the range resolution determined by the RF bandwidth when the DC coefficient is greater than each of the harmonic frequency coefficients.

11 Claims, 4 Drawing Sheets

NEAR OBSTACLE DETECTION SYSTEM

This invention relates to an obstacle detection system and more particularly to a narrow bandwidth frequency modulated continuous wave radar system for detecting nearby objects.

BACKGROUND OF THE INVENTION

Obstacle detection systems for providing an indication of the distance and/or warning of nearby objects have been proposed. One application for such systems is for detecting objects in proximity to an automotive vehicle. For example, the vehicle may employ a near obstacle detection system to alert the vehicle operator of the presence of obstacles behind the vehicle while backing the vehicle, to alert the vehicle operator of any obstacle in front of the vehicle below the operator's line of sight or to alert the operator of approaching vehicles in areas that are out of the view of the rear and side view mirrors.

Characteristics that are desirable in near obstacle detection systems include: (a) the ability to warn of obstacles having no motion relative to the detection system, (b) the ability to detect the closest of multiple objects, (c) the ability to provide a measure of distance to the object even at very close distances, and (d) the ability to operate in all environmental conditions.

Various systems have been proposed for near obstacle detection. One such system is based on the Doppler signal resulting from relative motion between the system and the object. As applied to a vehicle, this means that the system could not warn the driver of a passive obstacle behind the vehicle until the vehicle operator has initiated backward movement.

Ultrasonic and infrared near obstacle detection systems have also been proposed. Ultrasonic systems may be sensitive to wind noise and other ultrasonic noise sources and are constrained by the speed of sound while infrared systems suffer from back scattering caused from hydrometers and aerosols, sensitivity to object color and from contamination of the optical surfaces.

On the other hand, a frequency modulated continuous wave (FMCW) microwave radar system has all of the above listed desirable characteristics. However, present FMCW near obstacle detection systems require a large RF bandwidth in order to sense the range of objects very close to the radar system. For example, in present FMCW systems, a bandwidth of 500 MHz is required to sense an object at a range of 0.3 m, which is also the range resolution of the system. It would be desirable to decrease the bandwidth of an FMCW near obstacle detection system and thereby retain the desirable characteristics of such systems without increasing the minimum detection range of the system.

SUMMARY OF THE INVENTION

In accordance with this invention, an FMCW radar system having a reduced RF bandwidth is employed for sensing nearby objects. The RF bandwidth of the radar system is reduced to one-half the bandwidth normally required for an FMCW radar system for a given desired minimum detection range.

In general, an RF signal is transmitted at a frequency modulated by a sawtooth signal. The transmitted RF signal is mixed with a signal returned from an object to generate an intermediate frequency (IF) signal having a frequency equal to the difference between the frequencies of the transmitted and returned RF signals, the IF signal frequency being a measure of the range to the object. The difference between the low and high frequencies of the transmitted modulated RF signal comprises the RF bandwidth of the radar system. This difference establishes the minimum range resolution for the FMCW radar system.

The generated IF signal is analyzed into a Fourier series. The coefficients of the Fourier series include the coefficient representing the DC component of the IF signal and the coefficients representing the harmonics of the IF signal. The range of the object when equal to or greater than L (the minimum resolution of the FMCW radar system established by the RF bandwidth) is determined by the Fourier coefficients representing the harmonic frequencies. This invention provides for the measurement of distances less than L/2 based on the relationship of the DC component of the IF signal represented by the DC coefficient of the Fourier series and the harmonics of the IF signal represented by the harmonic coefficients of the Fourier series.

Particularly, in accord with this invention, if the magnitude of the DC coefficient of the Fourier series is greater than some predetermined value, the range to the target is within the distance L/2, which is one-half the normal resolution of the FMCW system. By using this range information, the radar system may be used to detect objects at shorter ranges for a given RF bandwidth or the RF bandwidth of the radar system may be reduced.

The invention may be best understood by reference to the following description of a preferred embodiment of the invention and the drawings in which.

Figure 1:
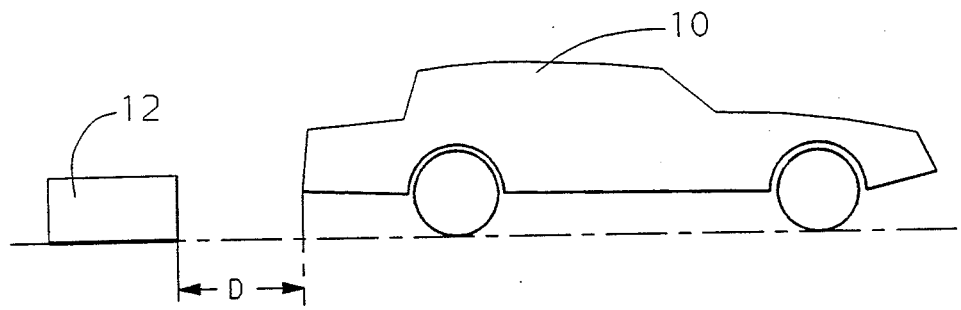
FIG. 1 depicts the application of the near obstacle detection system of this invention to sensing an object behind an automotive vehicle.

The near obstacle detection system of this invention is illustrated in FIG. 1 as applied to an automotive vehicle 10 for sensing an object 12 located at a distance D from the rear of the vehicle. As can be appreciated, it is desirable to sense the object at very low values of D so that all objects that may be out of view of the vehicle operator when backing the vehicle may be detected and a warning given. The radar system in this embodiment provides a signal (audio, visual or both) having a frequency indicating the distance D of the object behind the vehicle. It is, of course, understood that the radar system may be used to detect objects in proximity to the vehicle other than rearward, such as for detecting objects that are out of the view of the vehicle rear view mirrors.

The radar system utilized in the vehicle 10 of FIG. 1 is, as previously described, a frequency modulated continuous wave radar system. In this form of system, the transmitted signal is frequency modulated so that the frequency of an echo signal reflected from an object will be delayed from the frequency of the transmitted signal at any instant in time due to the round trip distance between the radar system and the object. This difference in frequency permits a measurement of the range to the target.

Figure 2:
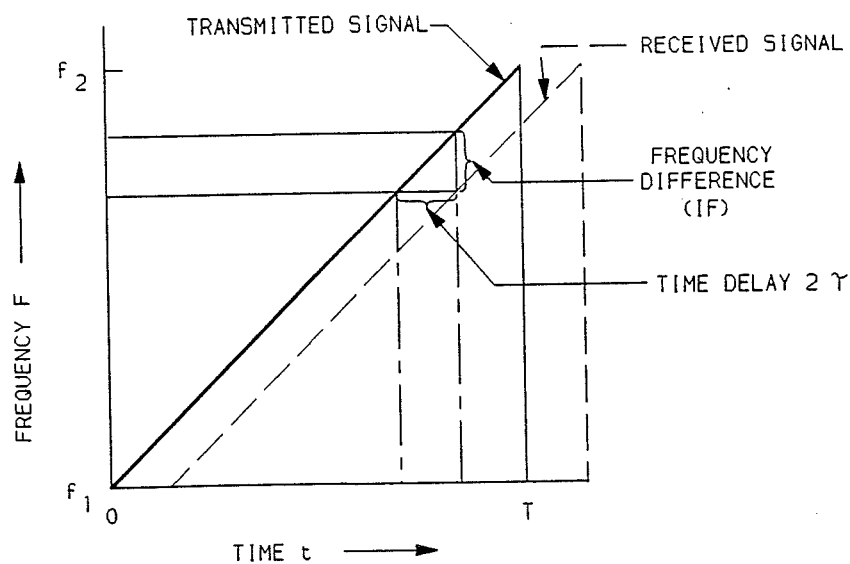
FIG. 2 is a diagram illustrating the transmitted and received RF signal from an FMCW radar system carried by the vehicle of FIG. 1.

Referring to FIG. 2, the frequency of the transmitted signal is made to increase linearly with time as indicated by the solid line. As depicted in this figure, the frequency changes from a frequency $f_1$ to a frequency $f_2$ over a time period T. The modulation rate of the transmitted signal is therefore $(f_2-f_1)/T$. If an object is located at a distance D from the radar system, the total round trip delay time for the signal is equal to $2\tau$ where $\tau$ equals D/C and where C is the speed of light. The resulting received signal is illustrated in FIG. 2 as the dotted line shifted in time from the transmitted signal by the time $2\tau$.

The instantaneous frequency deviation between the transmitted signal and the received signal is $2(f_2-f_1)\tau/T$. This difference frequency is commonly known as the intermediate frequency (IF) at the output of the radar system mixer as will be described. Over the time period T, the number of cycles in the IF signal at the mixer output is $2(f_2-f_1)\tau$.

To determine the range of the obstacle, the near obstacle detection system analyzes the IF signal into a Fourier series. For the Fourier components to be fully identified using a set of harmonically related frequencies $f_o, 2f_o, 3f_o \ldots$, a minimum of one full cycle must be present at the IF output. This condition dictates that the minimum RF bandwidth $f_2-f_1$ satisfy the expression $2(f_2-f_1)\tau=1$. This bandwidth corresponds to a range resolution of $L=C/2(f_2-f_1)$. For example, a 500 MHz sweep $(f_2-f_1)$ is required in order to achieve a 0.3 m resolution and in prior FMCW radar systems to be able to detect an object to within 0.3 m of the radar system.

The IF signal waveform f(t) having a frequency equal to the difference in the frequencies of the transmitted and returned signals and which is a measure of range may be represented by its Fourier components in the frequency domain, i.e., $$f(t) = C_0 + \sum_{n=1}^{\infty} [A_n \cos \omega_n t + B_n \sin \omega_n t]$$

where $\omega=2\pi n/T$ and n is an integer greater than 0 representing the harmonic frequency component. In the foregoing expression, the in phase component $A_n$ is equal to the following discrete form when the signal is sampled M times over the ramp time T:

$$\sum_{m=0}^{M-1} f_m \cos[2\pi nm/M]$$

where $n=0,1,\ldots,M-1$ and the quadrature component $B_n$ is equal to $$\sum_{m=0}^{M-1} f_m \sin[2\pi nm/M].$$

The Fourier coefficients of the output will be $C_n$ where $C_n$ equals the square root of the sum of the squares of $A_n$ and $B_n$. If the IF output coincides with one of the harmonic frequency components $\omega_m$, all of the Fourier coefficients $A_n, B_n$ will be zero except when $n=m$. In this case, the frequency of the IF signal is the harmonic frequency $\omega_m$ which is a measure of the distance to the object, the distance being equal to mL where L is the range resolution of the radar system dictated by the RF bandwidth as previously described. On the other hand, if the IF signal does not coincide with any of the harmonic frequency components $\omega_n$, $C_n$ will have a finite value for all integers n. In this case, the Fourier coefficients will be examined to determine the frequency of the IF signal and accordingly the range to the object. In one embodiment, the first harmonic frequency coefficient $C_n$ that exceeds a predetermined value in a constant amplitude controlled IF signal represents an object at a range of nL.

The above description provides for the measurement of the distance D to the object 12 of FIG. 1 by measurement of the frequency of the IF signal as represented by the Fourier coefficients when the distance D is greater than or equal to the distance L which is the range resolution determined by the RF bandwidth. The present invention, however, provides for sensing the obstacle 12 at distances D equal to or less than L/2 based on the DC component of the IF signal represented by the DC coefficient $C_O$ of the Fourier series and its relationship to the harmonic frequency components of the IF signal represented by the harmonic frequency components $C_n$ of the Fourier series. Particularly, the present invention recognizes that the distance to the object is less than L/2 if the DC coefficient $C_O$ is greater than a predetermined value which may be a constant in one embodiment or a value greater than any of the other coefficients $C_n$ associated with harmonics of the IF signal in another embodiment. In the latter embodiment, the presence of a DC coefficient whose magnitude exceeds that of the remaining Fourier coefficients indicates that an object is located at a range closer than L/2 from the receiver.

The ability to detect ranges less than L/2 permits the radar system operating bandwidth to be reduced by a factor of 2 while yet maintaining the capability of detecting objects within the desired minimum distance. For example, as previously indicated, a frequency bandwidth of 500 MHz was required in order to detect an object at 0.3 m from the radar system. However, by utilizing the aforementioned relationship of the DC coefficient of the Fourier series and the remaining Fourier coefficients, the bandwidth may be reduced to 250 MHz. While the range resolution decreases (increased spacing), the minimum range using the DC component of the IF signal remains at 0.3 m.

Figure 3:
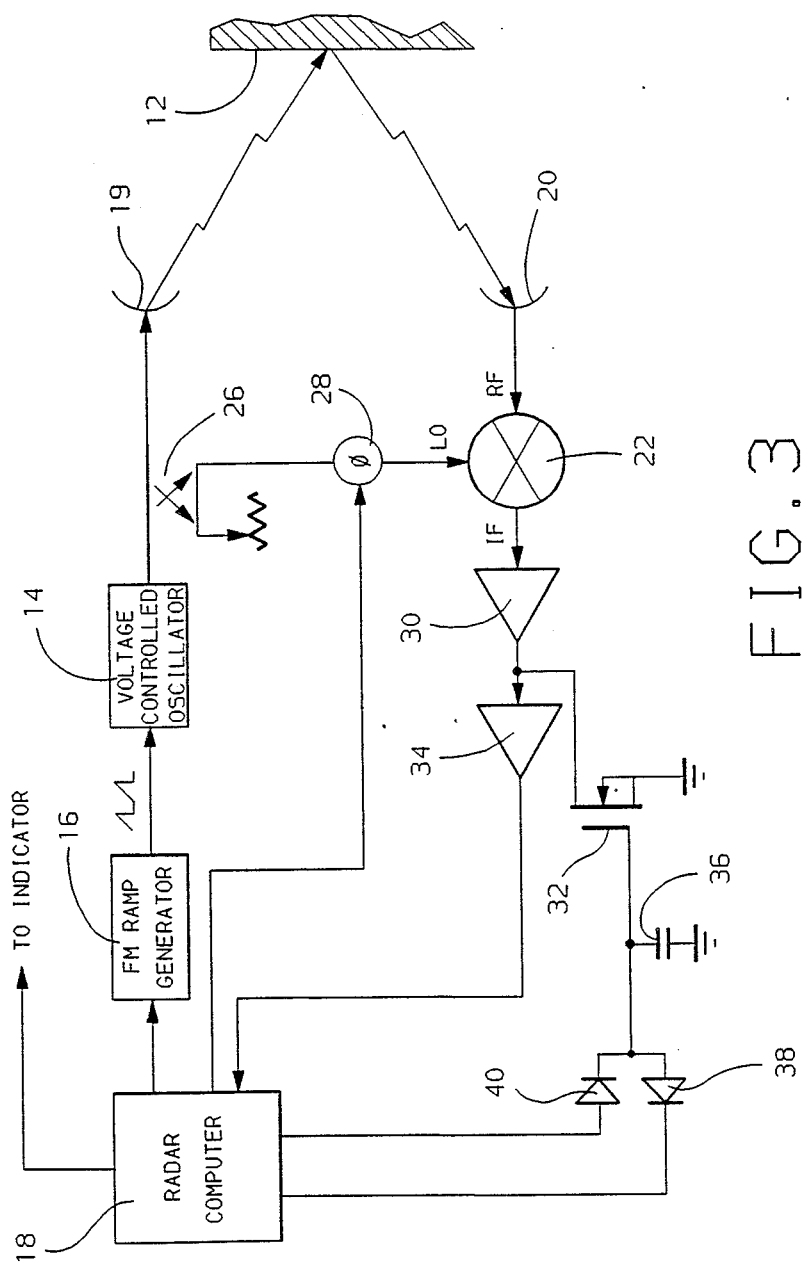
FIG. 3 is a general block diagram of the FMCW near obstacle detection system incorporating the principles of this invention.
Figure 4:
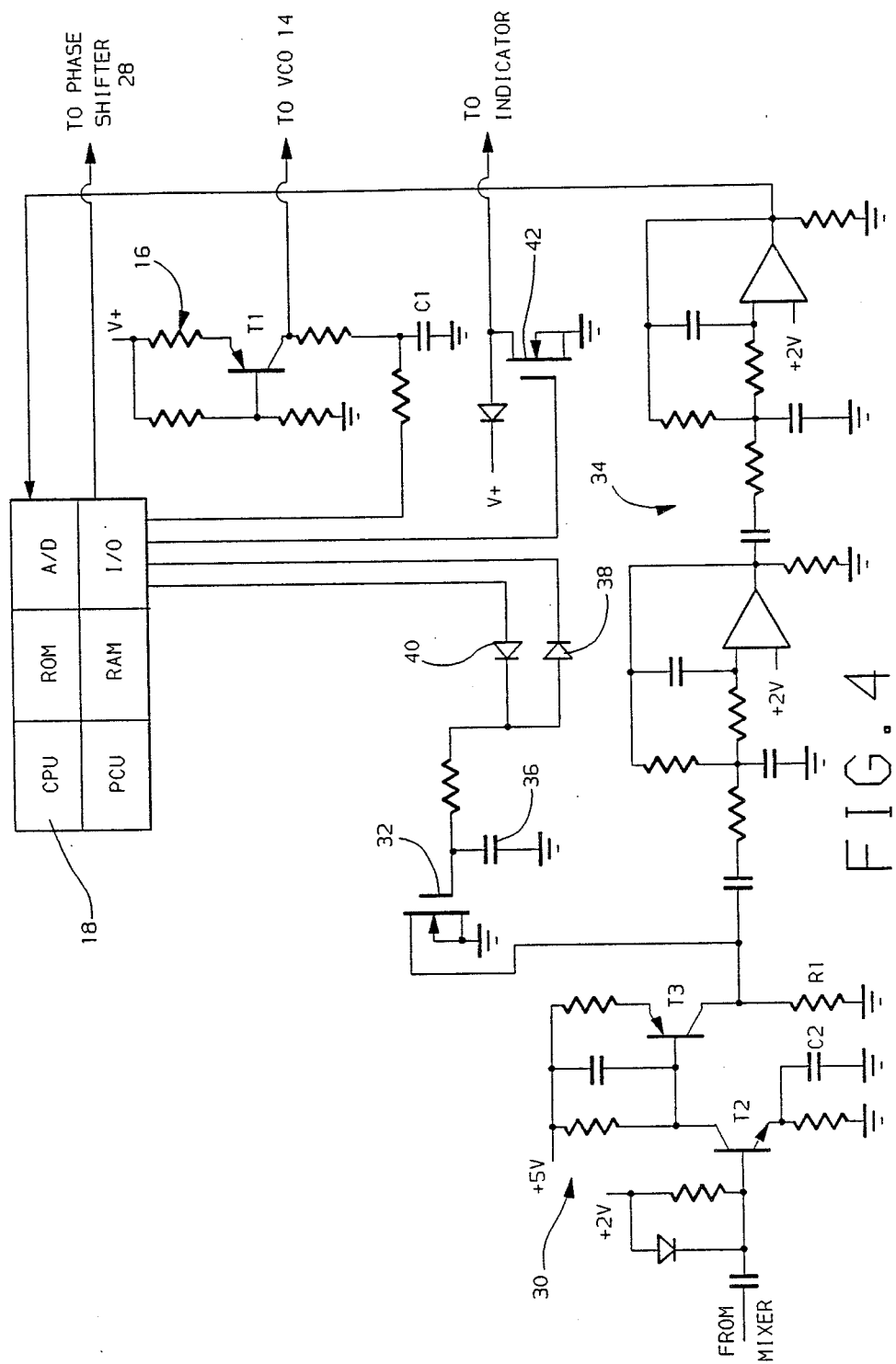
FIG. 4 is a more detailed circuit diagram of the radar system of FIG. 3.

Referring to FIGS. 3 and 4, the FMCW radar system carried by the vehicle 10 is illustrated. In general, a voltage controlled oscillator 14 is modulated by a triangular waveform generated by an FM ramp generator 16 under control of a radar computer 18. For illustration purposes, the $VC_O$ generates a 24 GHz signal and the FM ramp generator 16 is controlled to provide a 1 millisecond ramp to the voltage controlled oscillator 14 to linearly sweep the frequency output of the voltage controlled oscillator 14 by a total of 250 MHz. This frequency deviation provides a range resolution of 0.6 m.

A specific embodiment of the FM ramp generator is shown in FIG. 4. This ramp generator includes a capacitor C1 whose charge is controlled in the specific example to provide the 1 millisecond ramp signal at 1.5 millisecond intervals. In this regard, the capacitor C1 is held in a discharge condition by the radar computer 18. To initiate the ramp, the radar computer 18 opens the circuit input to the ramp generator 16 to allow the capacitor C1 to be charged via the transistor T1 to provide a linearly increasing ramp voltage to the voltage controlled oscillator 14. After the 1 millisecond interval, the radar computer 18 again provides a ground signal to discharge the capacitor and terminate the ramp signal. This cycle is repeated at 1.5 millisecond intervals.

The frequency modulated output of the voltage controlled oscillator 14 is provided to a transmitting antenna 19 which transmits the FMCW radar signal rearward from the vehicle 10. If an object, such as the object 12, is present behind the vehicle, the transmitted signal is reflected and received by a receiving antenna 20. The received RF signal is coupled from the antenna 20 to an RF input of a mixer 22. A local oscillator signal LO is provided to the mixer 22 from the output of the voltage controlled oscillator 14 via a coupler 26 and a bistate phase shifter 28 having alternating 0 degree and 90 degree phase states as controlled by the radar computer 18.

The radar computer 18 alternately shifts the phase state of the bistate phase shifter 28 with each ramp signal provided by the FM ramp generator 16. The resulting 0 and 90 degree phase states of the bistate phase shifter 28 will allow the evaluation of the DC coefficient $C_O$ of the Fourier series which equals the square root of the sum of the squares of $A_O$ and $B_O$, where $A_O$ is the DC component of the IF output of the mixer 22 when the phase shifter is set at zero degrees while $B_O$ is the DC component of the IF output when the phase shifter is set at 90 degrees.

The bistate phase shifter 28 is equivalent to using two mixers in quadrature. This arrangement assures the detection of an obstacle at a very close range avoiding misdetection when the local oscillator signal LO and the RF signal received from the object 12 are exactly 90 degrees out of phase.

The IF signal output of the mixer 22 is provided to a low noise amplifier 30 which includes transistors $T_2$ and $T_3$ and associated circuitry that includes a capacitor $C_2$ that helps reduce clutter by reducing the gain of the amplifier at decreasing ranges to an obstacle. The radar computer 18 provides for automatic gain control of the amplifier 30 by controlling the impedance of a field effect transistor 32 parallel coupled with a resistor $R_1$ in the collector circuit of the transistor $T_3$. In general, the impedance of the field effect transistor 32 for controlling the gain of the amplifier 30 is adjusted by the radar computer 18 to maintain a substantially constant peak-to-peak amplitude of the IF signal. This is accomplished by controlling the charge of a capacitor 36 connected to the gate of the transistor 32. The capacitor is discharged by the radar computer 18 through a diode 38 which has a high voltage normally applied to its cathode and charged by the computer through a diode 40 whose anode is normally grounded by the computer.

Upon terminating the ramp signal output of the generator 16, the radar computer 18 determines the peak-to-peak value of the IF signal and adjusts the impedance of the field effect transistor 32 by incrementally charging or discharging the capacitor 36 via diodes 38 or 40 in direction to control the gain of the amplifier 30 to maintain the desired constant peak-to-peak IF signal.

The gain controlled signal from the amplifier 30 is provided to a band pass filter 34 whose output comprises the IF signal input to the radar computer 18. In general, the band pass filter 34 is a 1 to 8 KHz band pass filter with additional gain. The band pass filter circuit illustrated in FIG. 4 provides for a 2 pole rolloff at 1 KHz and a 4 pole rolloff at 8 KHz.

The IF signal output of the bandpass filter is supplied to the radar computer which analyzes the signal to determine the range to an object 12 rearward of the vehicle 10. In general, the radar computer 18 samples the IF signal at 32 points during the period of the ramp provided by the FM ramp generator 16. A 32 point discrete Fourier transform is performed to evaluate the DC and harmonic levels of the IF signal. From the DC and harmonic levels, the range to the object 12 from the rear of the vehicle 10 is determined. In the specific example of this embodiment where the FM ramp generator provides for the 250 megahertz sweep over a period of 1 millisecond, the DC component of the Fourier series provides for detection of obstacles at ranges less than 0.3 m. The lowest ordered harmonic, 1 KHz, represents a range of 0.6 m and each successive higher ordered 1 KHz harmonic represents an additional range of 0.6 m. In this example, the resolution of the FMCW system is 0.6 m dictated by the 250 MHz sweep of the transmitted signal and the DC component of the IF signal is effective to provide an indication of an object within a range of 0.3 m from the radar system.

The radar computer provides an output to an indicator via an output driver transistor 42 for indicating the presence of an object behind the vehicle and the range to the object. The indicator may be a visual or audible indicator or both. The signal provided to the indicator takes the form of a variable frequency, square wave signal. In general, the period of the signal is proportional to range to the object so that as the object becomes closer to the vehicle, the frequency of the signal is increased exponentially. Other forms of indicators may be employed including a display providing a numerical indication of range.

The radar computer 18 takes the form of a standard digital computer. By way of example, the radar computer 18 may include a Motorola 68HC11 microprocessor along with a power supply generating the required voltages. The radar computer 18 includes a central processing unit (CPU) which executes an operating program permanently stored in a read only memory (ROM) which also stores tables and constants utilized in the determination of range and for controlling the various functions previously described. Contained within the CPU are the conventional counters, registers, accumulators, etc., along with a clock which provides a high frequency clock signal.

The computer 18 also includes a random access memory (RAM) into which data may be temporarily stored and from which data may be read at various address locations determined in accord with the program stored in the ROM. A power control unit (PCU) receives battery voltage and provides regulated power to the various operating circuits of the system. The computer 18 further includes an input/output circuit (I/O) that includes conventional discrete and timer output sections.

An analog-to-digital unit (ADU) is included which provides for the measurement of the IF signal output of the band pass amplifier 34. The IF signal amplitude is sampled and converted under control of the CPU and stored in ROM designated RAM memory locations.

Figure 5:
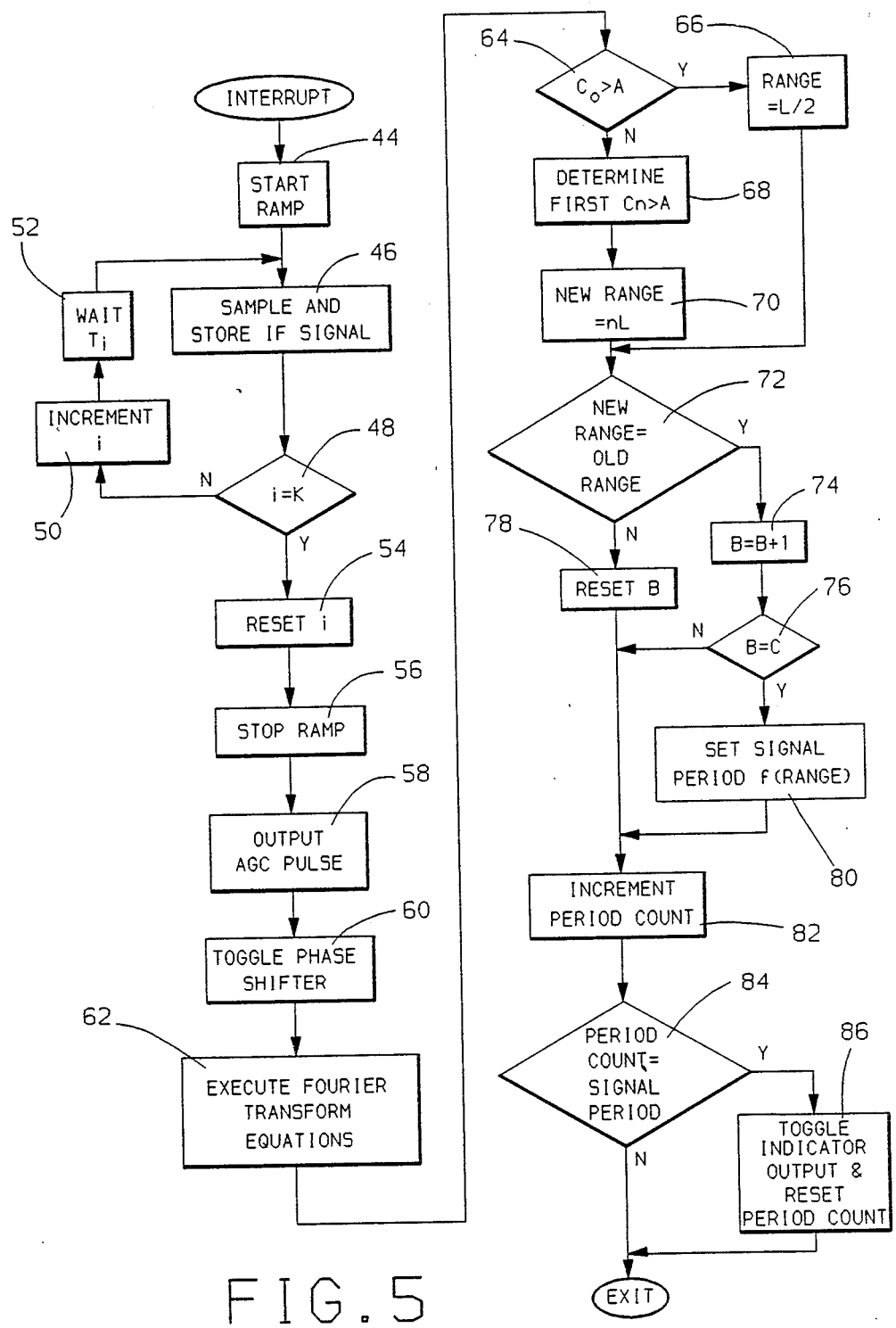
FIG. 5 is a flow diagram illustrating the operation of the radar computer of FIGS. 3 and 4 in carrying out the principles of this invention.

Referring to FIG. 5, the operation of the radar computer 18 in carrying out the principles of this invention is illustrated. The routine illustrated is executed once each 1.5 milliseconds as established by an internal timer counting clock pulses.

At the beginning of each 1.5 millisecond interrupt, the program proceeds to a step 44 where the FM ramp generator 16 is enabled to begin the voltage ramp by opening the circuit to the capacitor C1 of FIG. 4. A series of steps are then executed to obtain 32 samples of the IF signal value at 32 microsecond intervals. In other embodiments, more or less samples may be taken. These steps begin at step 46 where the value of the IF signal output of the mixer 22 is sampled and stored. At step 48, the value i of a counter register is compared to a value K representing the desired number of samples of the IF signal for each ramp output of the FM ramp generator 16 (equal to 32 in the present example). If i is not equal to K, i is incremented at step 50. Thereafter at step 52, the program waits for a time $T_1$ until time for the next sampling of the IF signal. As previously indicated, in this embodiment, the value of $T_i$ is 32 microseconds. With this interval, the 32 samples of the IF signal will take approximately 1 millisecond of time which is equal to the desired period of the ramp signal output of the ramp generator 16.

At the expiration of the time $T_1$, the program repeats the steps 46 through 52. This sequence is repeated until such time that K samples of the IF signal have been taken. When the desired number of samples of the IF signal have been taken, the program proceeds from step 48 to a step 54 where i is reset.

As indicated, the 32 samples of the IF signal at 32 microsecond intervals comprises the desired duration of the modulation of the transmitted RF signal. Accordingly at step 56 the ramp output of the generator 16 is reset by applying a ground signal to the capacitor C1 which is discharged. As viewed in FIG. 2, this results in the output of the voltage controlled oscillator 14 being returned to the frequency $f_1$.

At step 58, the program determines the difference between the minimum and maximum values of the sampled IF values. If it is determined that the difference deviates from the desired peak-to-peak value of the IF signal, the radar computer 18 applies either a ground pulse to the diode 40 to incrementally discharge the capacitor 36 or a positive voltage pulse to the diode 38 to incrementally charge the capacitor 36 depending upon the sense of the required change in the gain of the amplifier 30. The duration of the pulse is proportional to the gain error. The gain control pulse is provided immediately at the termination of the ramp output of the ramp generator 16 so as to allow time for the system to settle prior to the generation of the next frequency modulated radar signal. If the difference in the minimum and maximum sampled values of the IF signal represents the desired peak-to-peak amplitude, the radar computer 18 does not issue a charge or discharge pulse to the capacitor 36.

From step 58, the program proceeds to a step 60 where the bistate phase shifter 28 is toggled. This toggling shifts the output of the phase shifter between 0 and 90 degrees phase shift so as to enable the determination of the DC coefficient $C_O$ of the Fourier series. As previously indicated, the determination of the value of the DC coefficient $C_O$ from the value of $A_O$ of the Fourier series when the phase shifter output is set at 0 degrees and from $B_O$ when the phase shifter output is set at 90 degrees avoids a potential misdetection when the local oscillator signal LO provided to the mixer and the RF signal received from the obstacle 12 are exactly 90 degrees out of phase. If the bistate phase shifter 28 last provided a 0 degree phase shift to the local oscillator signal, it will provide a 90 degree phase shift during the next execution of the routine of FIG. 5.

At step 62, the program first executes the Fourier transform equations to determine the values of the coefficients $A_n$, $B_n$ and $A_O$ or $B_O$ (depending on the phase of the local oscillator signal LO provided by the bistate phase shifter 28). Step 62 then determines the DC coefficient $C_o$ from the values of $A_O$ and $B_O$ determined during the last two executions of the 1.5 millisecond interrupt routine of FIG. 5 and the last determined values of $A_n$ and $B_n$. The transform equations executed at step 62 are standard. In the present embodiment, step 62 executes discrete Fourier transform equations to determine the DC and frequency coefficients.

At step 64, the value of the DC coefficient $C_O$ is compared with a calibration threshold. If the DC coefficient is greater than a calibration constant A indicating a range to the obstacle less than L/2 (0.3 m in the present example), the program proceeds to a step 66 to set the range equal to L/2. On the other hand, if the value of the DC coefficient $C_O$ is less than A, the program proceeds to a step 68 where the first frequency coefficient $C_n$ that exceeds the constant A is identified. This identified harmonic frequency is a measure of the range to the obstacle 12. For example, if the coefficient $C_1$ (associated with the lowest ordered harmonic 1 KHz in the present example) is greater than A, the range to the obstacle is 0.6 m. Similarly, if the first coefficient greater than A is $C_4$ associated with the harmonic frequency 4 KHz, the range to the obstacle is 2.4 m.

In another embodiment, the value of A is variable and set equal to the largest value of the harmonic frequency coefficients $C_n$. In yet another embodiment, the value of A is set equal to the weighted sum of more than one of the harmonic coefficients.

At step 70, the sensed range to the obstacle is set equal to nL where n is the harmonic identified at step 68 and L is the minimum resolution determined by the frequency bandwidth of the transmitted RF signal (0.6 m in this example). In summary, steps 68 and 70 provide for an indication of the range to the obstacle 12 in 0.6 m increments up to 5 meters corresponding to the 8th harmonic frequency cutoff of the band pass filter 34.

The program next executes a series of steps to provide for limiting the change in the indicated range until the range reading has been determined to be in the same range bin for a predetermined consecutive number of range readings. By way of example, this number may be seven. At step 72 the program determines whether the new range determined at step 66 or 70 is the same as the range determined during the previous execution of the interrupt routine. If the range is equal to the old range, a number B stored in a register is incremented at step 74. This number is then compared at step 76 with a predetermined constant C such as seven. Returning to step 72, if the new range is not equal to the old range, the program proceeds to a step 78 where B is reset to zero.

Assuming the same range has been determined for C consecutive readings, the program proceeds from step 76 to a step 80 where the period of the signal for energizing the indicator is set as a function of the last sensed range. In general, a number establishing the period of a square wave signal is set proportional to the detected range to the object 12 so that as the range decreases the frequency of the signal provided to the vehicle operator via the visual or audible indicator increases exponentially. For example, the number set at step 80 may provide an indication to the vehicle operator via the audible or visual indicator having a one second period for a detected range of 5 m to the object 12 decreasing to a period of 100 milliseconds for a detected range of 0.3 m.

From step 76 if the number of consecutive readings has not been achieved or from step 78 and 80, the program proceeds to a step 82 where a period count timing the period of the signal provided to the indicator is incremented. At step 84 the value of the period count is compared to the period last set at step 80. If the set period has not expired, the program exits the interrupt routine. However, if the period has expired, the output to the indicator is toggled at step 86 and the period count is reset. In summary, the function of the steps 82 through 86 is to provide for the square wave output having a period determined by step 80 which in turn is established by the sensed range to the object. Accordingly, the operator is provided a visual or audible indication of the magnitude of the range to the object.

The foregoing description of a preferred embodiment of the invention for purposes of illustrating the invention is not to be considered as limiting or restricting the invention since many modifications may be made by the exercise of skill in the art without departing from the scope of the invention.

The embodiments of the invention in which an exclusive property or privilege is claimed are defined as follows:

1. A narrow bandwidth frequency modulated radar system for measuring the range to an object, the system comprising in combination:
   means for transmitting a frequency modulated radar signal;
   means for receiving the transmitted radar signal reflected from the object;
   means for mixing the transmitted and received radar signals to generate an IF signal;
   means for determining (A) the value of the DC component of the IF signal and (B) the value of each of the harmonic frequency components of the IF signal, and
   means for indicating the range (A) in accord with the frequency components when the value of the DC component is less than a predetermined value and (B) in accord with the DC component when the value of the DC component is greater than the predetermined value.

2. The radar system of claim 1 wherein the predetermined value is a constant value A.

3. The radar system of claim 1 wherein the predetermined value is the largest of the values of the harmonic frequency components.

4. The radar system of claim 1 wherein the frequency modulated radar signal is frequency modulated by a sawtooth signal that linearly varies the frequency of the transmitted radar signal from frequency $f_1$ to $f_2$.

5. A narrow bandwidth frequency modulated radar system for measuring the range to an object, the system comprising in combination:
   means for transmitting a frequency modulated radar signal having a frequency varying linearly from a frequency $f_1$ to a frequency $f_2$, the value $f_2-f_1$ comprising an RF bandwidth of the radar system establishing a minimum range resolution of L;
   means for receiving the transmitted radar signal reflected from the object;
   means for mixing the transmitted and received radar signals to generate an IF signal;
   means for analyzing the IF signal into a Fourier series having a DC coefficient representing a DC component of the IF signal and harmonic frequency coefficients each representing a value of a respective harmonic frequency component of the IF signal, the harmonic frequency coefficients representing the frequency of the IF signal;
   means for indicating the range to the object in multiples of the minimum range resolution L in accord with the frequency of the IF signal represented by the harmonic frequency coefficients when the DC coefficient is less than a predetermined value; and
   means for indicating a range to the object within ½ the range resolution L when the value of the DC coefficient is greater than the predetermined value, whereby an indication of the range to an object within ½ of the minimum range resolution of the radar system established by the RF bandwidth is provided.

6. The radar system of claim 5 wherein the predetermined value is a constant value A.

7. The radar system of claim 5 wherein the predetermined value is the largest of the values of the harmonic frequency coefficients.

8. A narrow bandwidth frequency modulated radar system for measuring the range to an object, the system comprising in combination:
   means for transmitting a frequency modulated radar signal having a frequency varying linearly from a frequency $f_1$ to a frequency $f_2$ over a time period T, the value $f_2-f_1$ comprising an RF bandwidth of the radar system and establishing a range resolution L that is defined by the expression $C/2(f_2-f_1)$;
   means for receiving the transmitted radar signal reflected from the object;
   means for mixing the transmitted and received radar signals to generate an IF signal;
   means for analyzing the IF signal into a Fourier series having a DC coefficient $C_O$ representing a DC component of the IF signal and a harmonic frequency coefficient $C_n$ for each frequency component $\omega_n$ of the IF signal, where n is an integer greater than zero and $\omega_n$ is equal to $2\pi n/T$; and
   means for indicating a range to the object equal to mL when the DC coefficient $C_O$ is less than a predetermined value, where m is equal to the integer value of n corresponding to the first harmonic frequency coefficient $C_n$ greater than the predetermined value and indicating a range to the object within L/2 when the DC coefficient $C_O$ is greater than the predetermined value, whereby the minimum detectable range is less than the range resolution L of the radar system established by the RF bandwidth.

9. A narrow bandwidth frequency modulated radar system for measuring the range to an object, the system comprising in combination:
   means for repeatedly generating a sawtooth waveform frequency modulated radar signal having a frequency varying linearly from a frequency $f_1$ to a frequency $f_2$ over a time period T, the value $f_2-f_1$ comprising an RF bandwidth of the radar system and establishing a range resolution L that is defined by the expression $C/2(f_2-f_1)$;
   means for transmitting the generated radar signal;

means for receiving the transmitted radar signal reflected from the object;

means for generating a local oscillator signal from the generated radar signal having alternating 0 degree and 90 degree phase shifts relative to the generated radar signal with successive sawtooth waveforms;

means for mixing the local oscillator signal and the received radar signals to generate an IF signal for each generated sawtooth waveform;

means for (A) analyzing the IF signal when the local oscillator signal has a 0 degree phase shift into a Fourier series having a DC coefficient $A_O$ representing a DC component of the IF signal and harmonic frequency quadrature components $A_n$ and $B_n$ for each frequency component $\omega_n$ of the IF signal, where n is an integer greater than zero and $\omega_n$ is equal to $2\pi n/T$, (B) analyzing the IF signal when the local oscillator signal has a 90 degree phase shift into a Fourier series having a DC coefficient $B_O$ representing a DC component of the IF signal and a harmonic frequency quadrature components $A_n$ and $B_n$ for each frequency component of the IF signal, and (C) determining a Fourier series DC coefficient $C_O$ and harmonic frequency coefficients $C_n$ where $C_O$ is equal to the square root of the sum of the squares of $A_O$ and $B_O$ and $C_n$ is equal to the square root of the sum of the squares of $A_n$ and $B_n$ for each integer value of n; and means for indicating a range to the object equal to mL when the DC coefficient $C_O$ is less than a predetermined value, where m is equal to the integer value of n corresponding to the first harmonic frequency coefficient $C_n$ greater than the predetermined value and indicating a range to the object within L/2 when the DC coefficient $C_O$ is greater than the predetermined value, whereby the minimum detectable range is less than the range resolution L of the radar system established by the RF bandwidth.

10. A narrow bandwidth frequency modulated radar system for measuring the range to an object, the system comprising in combination:

means for repeatedly generating a sawtooth waveform frequency modulated radar signal having a frequency varying linearly from a frequency $f_1$ to a frequency $f_2$ over a time period T, the value $f_2-f_1$ comprising an RF bandwidth of the radar system and establishing a range resolution L that is defined by the expression $C/2(f_2-f_1)$;

a transmitter for transmitting the generated radar signal;

a receiver for receiving the transmitted radar signal reflected from the object;

means for providing a local oscillator signal from the frequency modulated radar signal;

means for mixing the local oscillator signal and the received radar signal to generate an IF signal;

a variable gain amplifier for amplifying the IF signal;

means for controlling the gain of the amplifier so as to establish a constant peak-to-peak amplitude of the amplified IF signal;

means for analyzing the amplified IF signal into a Fourier series having a DC coefficient representing a DC component of the amplified IF signal and harmonic frequency coefficients each representing a value of a respective harmonic frequency component of the amplified IF signal;

means for indicating the range to the object in multiples of the minimum range resolution L in accord with a frequency of the IF signal represented by the harmonic frequency coefficients when the DC coefficient is less than a predetermined value; and means for indicating a range to the object within ½ the range resolution L when the value of the DC coefficient is greater than the predetermined value, whereby an indication of the range to an object within ½ of the minimum range resolution of the radar system established by the RF bandwidth is provided.

11. A method of measuring the range to an object, the method comprising the steps of:

repeatedly generating a sawtooth waveform frequency modulated radar signal having a frequency varying linearly from a frequency $f_1$ to a frequency $f_2$ over a time period T, the value $f_2-f_1$ comprising an RF bandwidth of the radar system and establishing a range resolution L that is defined by the expression $C/2(f_2-f_1)$;

transmitting the generated radar signal;

receiving the transmitted radar signal reflected from the object;

generating a local oscillator signal from the generated radar signal having alternating 0 degree and 90 degree phase shifts relative to the generated radar signal with successive sawtooth waveforms;

mixing the local oscillator signal and the received radar signals to generate an IF signal for each generated sawtooth waveform;

analyzing the IF signal when the local oscillator signal has a 0 degree phase shift into a Fourier series having a DC coefficient $A_O$ representing a DC component of the IF signal and harmonic frequency quadrature components $A_n$ and $B_n$ for each frequency component $\omega_n$ of the IF signal, where n is an integer greater than zero and $\omega_n$ is equal to $2\pi n/T$;

analyzing the IF signal when the local oscillator signal has a 90 degree phase shift into a Fourier series having a DC coefficient $B_O$ representing a DC component of the IF signal and harmonic frequency quadrature components $A_n$ and $B_n$ for each frequency component of the IF signal;

determining the Fourier series DC coefficient $C_O$ and harmonic frequency coefficients $C_n$ where $C_O$ is equal to the square root of the sum of the squares of $A_O$ and $B_O$ and $C_n$ is equal to the square root of the sum of the squares of $A_n$ and $B_n$ for each integer value of n; and indicating a range to the object equal to mL when the DC coefficient $C_O$ is less than a predetermined value, where m is equal to the integer value of n corresponding to the first harmonic frequency coefficient $C_n$ greater than the predetermined value and indicating a range to the object within L/2 when the DC coefficient $C_O$ is greater than the predetermined value, whereby the minimum detectable range is less than the range resolution L of the radar system established by the RF bandwidth.

* * * * *